US009800370B2

(12) United States Patent
Gineste

(10) Patent No.: US 9,800,370 B2
(45) Date of Patent: Oct. 24, 2017

(54) METHOD AND SYSTEM FOR PROCESSING DATA IN A TELECOMMUNICATIONS SYSTEM FOR DYNAMIC ADAPTATION TO THE QUANTITY OF DATA TO BE TRANSMITTED

(71) Applicant: THALES, Courbevoie (FR)

(72) Inventor: Mathieu Gineste, Toulouse (FR)

(73) Assignee: THALES, Courbevoie (FR)

( * ) Notice: Subject to any disclaimer, the term of this patent is extended or adjusted under 35 U.S.C. 154(b) by 49 days.

(21) Appl. No.: 14/885,877

(22) Filed: Oct. 16, 2015

(65) Prior Publication Data
US 2016/0119080 A1 Apr. 28, 2016

(30) Foreign Application Priority Data
Oct. 24, 2014 (FR) ..................................... 14 02391

(51) Int. Cl.
*G06F 11/00* (2006.01)
*H04L 1/00* (2006.01)
(Continued)

(52) U.S. Cl.
CPC ............ *H04L 1/0041* (2013.01); *G06F 11/10* (2013.01); *H04L 1/0042* (2013.01); *H04L 1/0057* (2013.01); *H04L 12/4633* (2013.01)

(58) Field of Classification Search
CPC . H04L 1/0041; H04L 1/0042; H04L 12/4633; G06F 11/1068; G06F 11/108; G06F 11/10
See application file for complete search history.

(56) References Cited

U.S. PATENT DOCUMENTS 8,204,919 B2 * 6/2012 Oka ....................... G11B 20/10
382/302
8,675,646 B2 * 3/2014 Jung ....................... H04L 1/007
370/384

(Continued)

FOREIGN PATENT DOCUMENTS

WO 2007/064764 A1 6/2007
WO 2010/022786 A1 3/2010

OTHER PUBLICATIONS

Zhengang Chen et al., "Low-Density Parity-Check Convolutional Codes Applied to Packet Based Communication IEEE Global Telecommunications Conference Systems," vol. 3, Nov. 28, 2005, pp. 1250-1254, XP010880931.
(Continued)

*Primary Examiner* — Esaw Abraham
(74) *Attorney, Agent, or Firm* — Baker & Hostetler LLP

(57) ABSTRACT

A method of processing data in a telecommunications system enabling dynamic adaptation of the quantity of data to transmit. The data is organized into a set of packets contained in a first layer of a communication model. The method includes a first step of passage of an item of information indicating the size of each packet or representative of this size between the first layer and a second layer. It also includes a second step of encapsulation of the packet and of passage of the packet between the first layer and the second layer in a container the size of which is adapted to the information indicating the size of a packet or representative of this size. The method finally includes a third step of application of a block error correcting code to the data contained in the container, the correcting code adapting dynamically to the size of the container.

7 Claims, 1 Drawing Sheet

(51) Int. Cl.
G06F 11/10 (2006.01)
H04L 12/46 (2006.01)

(56) References Cited

U.S. PATENT DOCUMENTS

| 8,745,471 B2 * | 6/2014 | Murakami | H03M 13/118 |
| | | | 714/781 |
| 9,116,823 B2 * | 8/2015 | Fillingim | G06F 11/1044 |
| 9,213,594 B2 * | 12/2015 | Strasser | G06F 11/1044 |
| 9,276,611 B2 * | 3/2016 | Murakami | H03M 13/118 |
| 9,495,241 B2 * | 11/2016 | Flynn | G06F 12/0253 |
| 2013/0086456 A1 * | 4/2013 | Yedidia | H03M 13/036 |
| | | | 714/781 |

OTHER PUBLICATIONS

Yun Chen et al., "An Efficient Multi-Rate LDPC-CC Decoder With Layered Decoding Algorithm," 2013 IEEE International Conference on Communications, pp. 5548-5552, XP032522088.

* cited by examiner

METHOD AND SYSTEM FOR PROCESSING DATA IN A TELECOMMUNICATIONS SYSTEM FOR DYNAMIC ADAPTATION TO THE QUANTITY OF DATA TO BE TRANSMITTED

CROSS-REFERENCE TO RELATED APPLICATION

This application claims priority to foreign French patent application No. FR 1402391, filed on Oct. 24, 2014, the disclosure of which is incorporated by reference in its entirety.

FIELD OF THE INVENTION

The present invention concerns a method and a system for transmission of data. It is usable in particular in the field of satellite telecommunications but is also usable in the field of terrestrial telecommunications.

BACKGROUND

In the field of satellite telecommunications, in particular for the return channel (the return channel corresponds to the transmissions between the user terminal and a gateway on the ground via the satellite) or for direct communication between terminals via the satellite, the transmission of sporadic data causes a loss of efficiency in the use of resources. In fact, this sporadic transmission from a user terminal implies a low aggregation of the data at this terminal. The transmission bit rate is then below the maximum bit rate that can be achieved. This is caused by the segmentation of the data packets into a set of fragments with the aim of adapting to the size of the containers that the physical layer of the satellite can process. A fragment is a sub-set of a higher level message (if the communication protocol uses a layered model). The use of fragments results from the fact that the size of a message can be greater than the maximum size of a container. In this case, in order to transmit the message, a plurality of fragments must be constituted and transmitted independently of one another. Once the fragments have been received, the activity that consists in reconstituting the original message from these fragments is the reassembly. A container is a virtual receptacle having a defined size (in bits) that can receive data in order to transport it. If the size of the data packets is different from the size of these containers or is not a multiple of the size of these containers (which can frequently be the case), the segmentation of the packets necessitates the insertion of padding symbols. The inefficiency in terms of the use of the resource caused by inserting these padding symbols can reach almost 50% (in the case of a data packet having a size very slightly larger than that of the container). The fixed size of these containers is generally imposed by the physical layer applying an error correcting code.

It is known from the prior art, as for example in the article "Low-Density Parity-Check Convolutional Codes applied to packet based communication systems", by Z. Chen, IEEE Globecom 2005, to use convolutional error correcting codes, such as LDPC-CC (the acronym for "Low Density Parity Check Convolutional Codes") codes, for example, having good levels of performance without being dedicated to a fixed size. These codes, in memory, nevertheless require the insertion of sequences upstream and downstream of the data to be transmitted, lowering the bit rates in a manner identical to the padding bits. Where the data packets to be coded are of small size, these sequences can represent a large proportion of the data to be transmitted.

It is also known from the prior art to use block correcting codes, the performance of which is better than that of convolutional codes. The application of a block error correcting code is optimized for a given block size. A data block is all of the data that has been included in the container by the higher layer (possibly complemented by a header or a trailer).

There are known communication models and data transmission methods that are organized in a plurality of layers. For example, the OSI model includes in particular the network, data link and physical layers. In these systems, the size of the data blocks managed by the physical layer is fixed by constraints linked to coding, the constraints of the communication channel access protocol and possibly other constraints (a plurality of discrete sizes may nevertheless coexist in a given standard). However, the size of the packets of the network layer and the size of the data blocks of the physical layer are not necessarily identical or even one a multiple of the other because of the possible disparity in terms of the volume of the information to be transported. This size difference between the packets of the network layer and the data blocks processed by the physical layer obliges the data link layer to effect a segmentation that may necessitate considerable insertion of padding symbols leading to a loss of efficiency in terms of the use of the resource (close to 50% in the worst case).

There are known in the prior art methods for adapting the efficiency of the correcting code, as in PCT application WO 2010/022786 A1, in order to adapt the size of the packets to the size of the containers. However, these methods require the use of correcting codes that are highly adaptable in terms of efficiency, and transmission of the information about the coding rate used to the decoder.

There are also known in the prior art, as for example in PCT application WO 2007/064764 A2, methods and systems in which the physical layer offers a plurality of different container sizes. The physical layer therefore utilizes a certain number of predefined container sizes in which the data received from the higher layers must be encapsulated. Encapsulation consists in integrating the higher level message into a data entity of the level in question by adding control information (generally by way of a header and potentially a trailer). The converse process, enabling extraction of the message and removal of the control information in order to pass it to the higher level, is referred to as de-encapsulation. One or more physical container sizes may be used, therefore making it possible:

to adapt to the propagation conditions of the transmission channel for example, if an error correcting code is not used, or to adapt to the constraints governing access to the resource and to the performance of the waveform if a plurality of symbol bit rates or an adaptive waveform are used.

However, these different container sizes (associated with coder blocks) are generally limited in number (non-continuous available sizes) and potentially decorrelated from the size of the packets managed by the higher layers, which therefore does not make it possible to solve completely the problem of the loss of efficiency linked to inserting padding symbols when segmenting these packets.

There is known in the prior art a method known as VSP (Variable Size Packet) which uses the different block sizes defined in the DVB-RCS standard to improve the efficiency of encapsulation from the network level to the physical level. This solution, over and above the complexity of implementation of the coder (more than ten interleavers to be stored in memory of a Field-Programmable Gate Array (FPGA)), does not solve the problem of the threshold effect of the encapsulation and the associated efficiency. It makes it possible to improve the efficiency of use partly but not to eliminate padding completely as the envisaged solution proposes.

SUMMARY OF THE INVENTION

The present invention aims to remedy these problems by proposing a data transmission method avoiding a loss of efficiency caused in particular by inserting padding symbols linked to the segmentation and to the encapsulation of the packets.

In accordance with one aspect of the invention, there is proposed a method of processing data in a satellite telecommunications system enabling dynamic adaptation of the quantity of data to transmit. The data is organized into a set of packets contained in a first layer of a communication model. The method includes a first step of passage of an item of information indicating the size of each packet or representative of this size between the first layer and a second layer. It also includes a second step of encapsulation of the packet and of passage of the packet between the first layer and the second layer in a container the size of which is adapted to the information indicating the size of a packet or representative of this size. The method finally includes a third step of application of a block error correcting code to the data contained in the container, the correcting code adapting dynamically to the size of the container.

The proposed solution therefore makes it possible to eliminate completely the insertion of padding symbols linked to segmentations of different sizes of packets supplied by the higher levels of the transmission process. To do this the invention proposes to eliminate the segmentation step and to modify the block error correcting code so that it adapts to the size of the higher level packets that have been encapsulated previously. This therefore implies that the code also adapts dynamically to the size of these packets that are supplied to it as input.

The third step is advantageously adapted to use a protograph quasi-cyclic error correcting code. The size of a base matrix associated with the protograph quasi-cyclic code is dynamically adapted to the information indicating the size of the packet or representative of this size. This adaptation is effected by changing an extension factor associated with the base matrix. The size of the matrix of the protograph quasi-cyclic code will therefore be adapted to the size of the container by changing the extension factor of the base matrix in an appropriate manner.

A protograph quasi-cyclic code corresponds to a particular version of the LDPC (Low Density Parity Check) codes. An LDPC code is defined by a (hollow) parity matrix H. The quasi-cyclic version corresponds to a particular form of the parity matrix H (of size M×N) in which a submatrix (base matrix) Hb of size p×p is repeated in the matrix H.

The matrix H therefore has dimensions corresponding to a multiple of the dimensions of the base matrix such that M=p*Z and N=p*Z, Z corresponding to the extension factor.

These codes have the particular feature that they can be characterized uniquely by the sub-matrix (or base matrix) Hb, which leads to an increase in the amount of room in the programmable gate array by a factor $Z^2$.

Moreover, by storing only the base matrix Hb, it will be possible to modify the size of the matrix H by changing the extension factor Z of the base matrix. This therefore makes it possible to encode blocks of data of different sizes without having to store a large amount of data in a programmable gate array but only the base matrix.

The protograph concept, known to the person skilled in the art, corresponds to a particular simplified representation of the base matrix defining a base pattern enabling this matrix Hb to be generated.

Compared to other codes, using protograph quasi-cyclic codes makes it possible to achieve better efficiency for a plurality of container packet or fragment sizes and therefore improved dynamic adaptability of the codes. Moreover, the great flexibility of these codes does not lead to high calculation complexity, high memory resource requirement and/ or a large number of gates in the context of an implementation on a programmable gate array. The person skilled in the art knows the quasi-cyclic codes based on ARA (Accumulate Repeat Accumulate) protographs, ARJA (Accumulate Repeat Jagged Accumulate) protographs, IRA (Irregular Repeat Accumulate) protographs, E2RC (Efficiently-Encodable Rate-Compatible) protographs, G-LDPC (generalized LDPC codes) protographs, etc. These codes make it possible to obtain very low packet error rates ($<10^{-6}$ when the additive noise distribution respects a Gaussian probability law), including for small packet sizes (<600 bits), whilst maintaining limited complexity and a limited number of gates in the context of an implementation on a programmable gate array. These codes are used for example for WiMAX (Worldwide Interoperability for Microwave Access) and then have an IRA type structure. These codes are also developed by the CCSDS (Consultative Committee for Space Data Systems) standardization organization and have an ARJA type structure.

The dimensioning of the error correcting code effected during the third step of adaptation of the error correcting code advantageously corresponds exactly to the size of said container. In this way, inserting padding bits making it possible to adapt the size of the container to the size of the error correcting code is not necessary.

The dimensioning of the error correcting code effected during the third step of adaptation of the error correcting code is advantageously effected for a given efficiency. The adaptation of the dimensioning of the error correcting code is therefore effected for a given efficiency, chosen as a function of the environment (propagation conditions, criticality of the transmitted information, target bit rate, etc.).

The third step is advantageously effected by the physical layer.

The first step and/or the second step is or are advantageously effected by the data link layer.

The first step and/or the second step is or are advantageously effected by the network layer.

The method advantageously further includes a fourth step of segmentation effected in the first layer.

The data transmission system advantageously includes at least one sender/receiver characterized in that said sender/ receiver includes means for executing the steps of the method described above.

BRIEF DESCRIPTION OF THE DRAWINGS

The invention will be better understood and other advantages will become apparent on reading the following detailed description given by way of nonlimiting example and with the assistance of the figures, in which.

DETAILED DESCRIPTION

Figure 1:
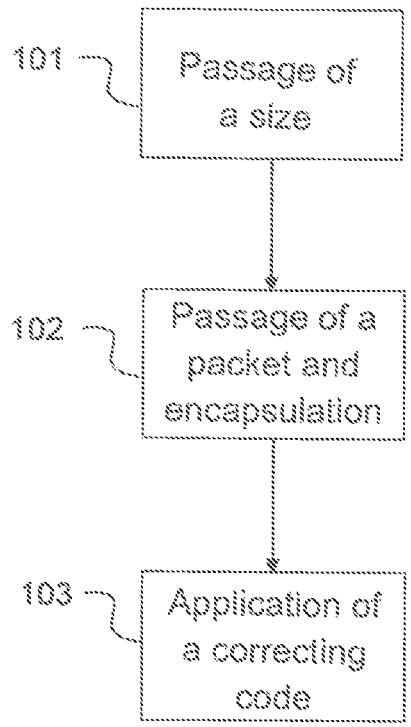
FIG. 1 shows one embodiment of the method in accordance with one aspect of the invention.

The method shown in FIG. 1 processes data organized into different packets of potentially variable size. The method uses data that is used by a first layer of a communication model. The first step 101 consists in the passage of an item of information representative of the size of the packet to be processed between the first layer and a second layer. The step 102 then consists in the passage of this packet between the first layer and the second layer. This step also enables encapsulation of the data contained in the packet in a container. The size of the container is adapted to the information representative of the size of a packet. This step is effected in the second layer of the communication model. The step 103 then enables the application of a block error correcting code to the data contained in the container. The dimensioning parameters used for the application of this block error correcting code are chosen as a function of the size of the container. These parameters vary over time in order to adapt continuously to the size of the containers.

Figure 2:
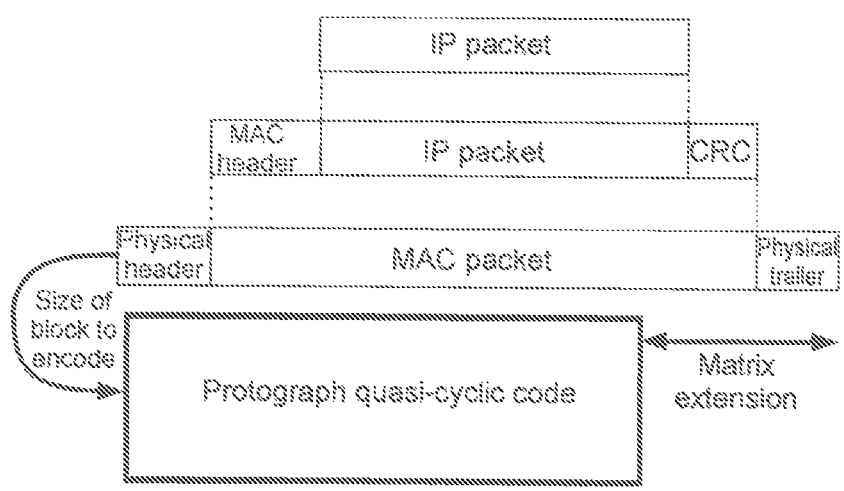
FIG. 2 shows another embodiment of the method in accordance with one aspect of the invention.

FIG. 2 shows an embodiment of the invention in which the communication model used corresponds to the TCP/IP protocol stack and the method uses at the physical layer level a protograph quasi-cyclic code.

In this figure, an IP packet is encapsulated without fragmentation in an MAC (Medium Access Control) level packet, comprising a header and a trailer (here a CRC (Cyclic Redundancy Check) pattern).

The MAC packet is then directly encapsulated in a physical frame containing a header and a trailer. The coder adapts its size directly to the size of the physical frame.

In one embodiment of the method the correcting code used is based on a protograph quasi-cyclic code. The use of these codes makes it possible to obtain the best performance because these codes enable easy adaptation of the code to the size of the packets/containers to which the correcting code is to be applied. The flexibility of this type of code enables this matrix extension to be effected in real time without additional complexity or high requirements in terms of memory space or number of gates in the case of implementation of the method on a field programmable gate array. The person skilled in the art knows the quasi-cyclic codes based on protographs (ARA, ARJA, IRA, E2RC, G-LDPC, etc.). These codes make it possible to obtain very low packet error rates ($<10^{-6}$ if the additive noise distribution respects a Gaussian probability law), including for small packet sizes (<600 bits), whilst preserving limited complexity and a limited number of gates in the context of an implementation on a programmable gate array. These codes are used for WiMAX for example and then have an IRA type structure. These codes are also developed by the CCSDS (Consultative Committee for Space Data Systems) standardization organization and have an ARJA type structure.

In one embodiment of the method the correcting code used is a turbo code. The use of these codes enables great flexibility in terms of the size of the packets/containers to be processed whilst preserving good performance. However, these codes have the disadvantage of having to store a set of interleavers to adapt efficiently to the different packet/container sizes. Storing this set of interleavers increasing the requirements in terms of memory space or number of gates in the case of implementation of the method on a field programmable gate array.

In one embodiment the first step 101 is effected by the data link layer. The second step 102 is effected by the data link layer. The third step 103 is effected by the physical layer. The method therefore corresponds to the use of direct encapsulation of the packets received by the data link layer in containers of the physical layer. The physical layer adapting dynamically to the size of the packets received from the data link layer for the application of the correcting code. The objective of this direct encapsulation is to eliminate the insertion of symbols linked to fragmentation and possible insertion of padding symbols and it therefore makes it possible to improve the efficiency of the use of resources.

In one embodiment (shown in FIG. 2), the method is effected in the following manner. The data is organized into a first set of packets by the data link layer, of GSE (Generic Stream Encapsulation) or RLE (Return Link Encapsulation) type. These data link level encapsulation techniques make it possible to adapt to a large number of higher level packet sizes without fragmentation being necessary. The data received can be organized into IP (Internet Protocol) type packets. A resource (which may be a timeslot, a frequency band) is determined for the different packets to be transmitted. This determination may be effected on demand during use of the method or before use of the method. The first step 101 makes it possible to pass the size of the packets between the data link layer and the physical layer. The second step 102 makes it possible to pass packets between the data link layer and the physical layer and encapsulation in containers the size of which depends on the size of the packets. The third step 103 of application of a correcting code then makes it possible to apply the correcting code directly to the data contained in the containers, this step being effected by the physical layer. In order to perform this application, the size of the packet is passed to the block error correcting code application mechanism in order to adapt dynamically to the size of the container (for example thanks to the use of a quasi-cyclic code making it possible to extend its matrix in real time to adapt to the required size) and to encode the frame using the required code ratio (the code ratio is the number of symbols in a packet before application of the correcting code divided by the number of symbols in the same packet after application of the correcting code and may also be variable if an adaptive correcting code mechanism is used).

In one embodiment it is possible to add a step of segmentation of the packets, supplied by the higher level, in order for the latter not to exceed a maximum size, in particular to make it possible for the method to be able to send data in a defined time slot. The step of application of a block error correcting code is then adapted so that the dimensioning of the correcting code is based on the size of the containers.

In one embodiment the system and the method conform to the DVB-RCS (Digital Video Broadcasting-Return Channel via Satellite) standard. In this case the error correcting code uses duo-binary turbo codes. These codes have some flexibility regarding the size of the containers, but performance varies greatly as a function of the sizes of the packets to be encoded, notably at the level of the packet error rate that the code can achieve. However, in one embodiment, and by relaxing the performance that the physical layer is required to achieve (i.e. by envisaging that performance in terms of packet error rates between $10^{-4}$ and $10^{-5}$ is sufficient), it is possible to modify the turbo code so that it can adapt dynamically to the size of the packets processed. However, in this embodiment, it is necessary to store the parameters of the interleaver of the turbo code for all the sizes that may be envisaged (choosing interleaver parameters that are random or common to two sizes can have a negative impact on the performance of the code, in particular on the minimum distance on which the error floor depends; in fact the error floor of a turbo code is directly linked to the Hamming distance of the code, as the person skilled in the art knows). Consequently, given the code interleaver generation algorithm (which necessitates four parameters for generation), and if it is necessary to store the parameters of the interleaver for all the possible sizes between 77 and 1500 (and therefore 1423 sizes), this amounts to storing in memory on a field programmable gate array more than 5600 characters for the interleavers of a turbo code alone. In order to limit the number of characters to be stored in memory, it is possible in another embodiment to replace the turbo code by a protograph cyclic code. In this embodiment the memory imprint of the correcting code corresponds to the size of the matrix of the protograph cyclic code, i.e. 240 (12*20) characters (in the case of using an ARJA type code, defined by the CCSDS standardization organization, the size of the base matrix of which corresponds to 12*20=240 characters).

In another embodiment the method and the system conform to the Digital Video Broadcasting—Satellite—Second Generation (DVB—S2) standard. In this case, the codes used are protograph quasi-cyclic codes of extended-IRA type. However, in the known system or method only three sizes are envisaged for the packets processed by the physical layer. In one embodiment, it is possible to modify the physical layer in order to make the size of the packets used flexible by modifying the extension factors in order to obtain the required packet size. For this it would be necessary to change the matrix of the LDPC code by a quasi-cyclic matrix and to modify the extension factor.

In another embodiment the method and the system conform to a WiMAX terrestrial telecommunication standard. In this standard the error correcting code used by default is a turbo code, which is not flexible in terms of packet size. In one embodiment it is therefore possible to modify this error correcting code in order for example to replace it with a protograph quasi-cyclic code using the size parameters that can be used by the standard.

In all the embodiments described in the preceding three paragraphs the data link layer no longer needs to effect segmentation of the received packets during encapsulation of the data in the physical containers. These packets received from the higher layers are therefore processed directly and the error correcting code is applied directly to these packets.

In one embodiment one or more terrestrial senders/receivers and a satellite make it possible to use the method as described in the different embodiments in the above paragraphs. The different steps of the method may be effected on a generic processor, for example, a dedicated processor, an application-specific integrated circuit (ASIC) or a field programmable gate array.

The invention claimed is:

1. A method of processing data in a telecommunications system, said data being organized into a set of packets contained in a first layer of a communication model, said method comprising:
  passing an item of information indicating a size of a packet or a representative of the size of the packet between said first layer and a second layer;
  passing said packet between said first layer and said second layer and encapsulating said packet in a container, the size of the container being adapted to said size of said packet or the representative of said size, said container belonging to said second layer; and
  dynamically dimensioning a size of a base matrix associated to a protograph quasi-cyclic LDPC block error correcting code according to the size of said container, said dynamic dimensioning of the size of the base matrix being effected by changing an extension factor associated with said base matrix and applying said block error correcting code to the data contained in said container.

2. The method of claim 1, wherein dynamically dimensioning the size of the base matrix corresponds exactly to the size of said container.

3. The method of claim 1, wherein dynamically dimensioning the size of the base matrix is effected for a given efficiency.

4. A data transmission system comprising:
  at least one sender/receiver including a processor configured to perform the method of claim 1.

5. The method of claim 1, wherein the first layer is a network layer.

6. The method of claim 1, wherein the first layer is a data link layer.

7. The method of claim 1, wherein the second layer is a physical layer.

* * * * *